April 29, 1924.  
F. A. GLOVER  
AUTOMOBILE GASOLINE CONTROL  
Filed April 12, 1923
1,492,447
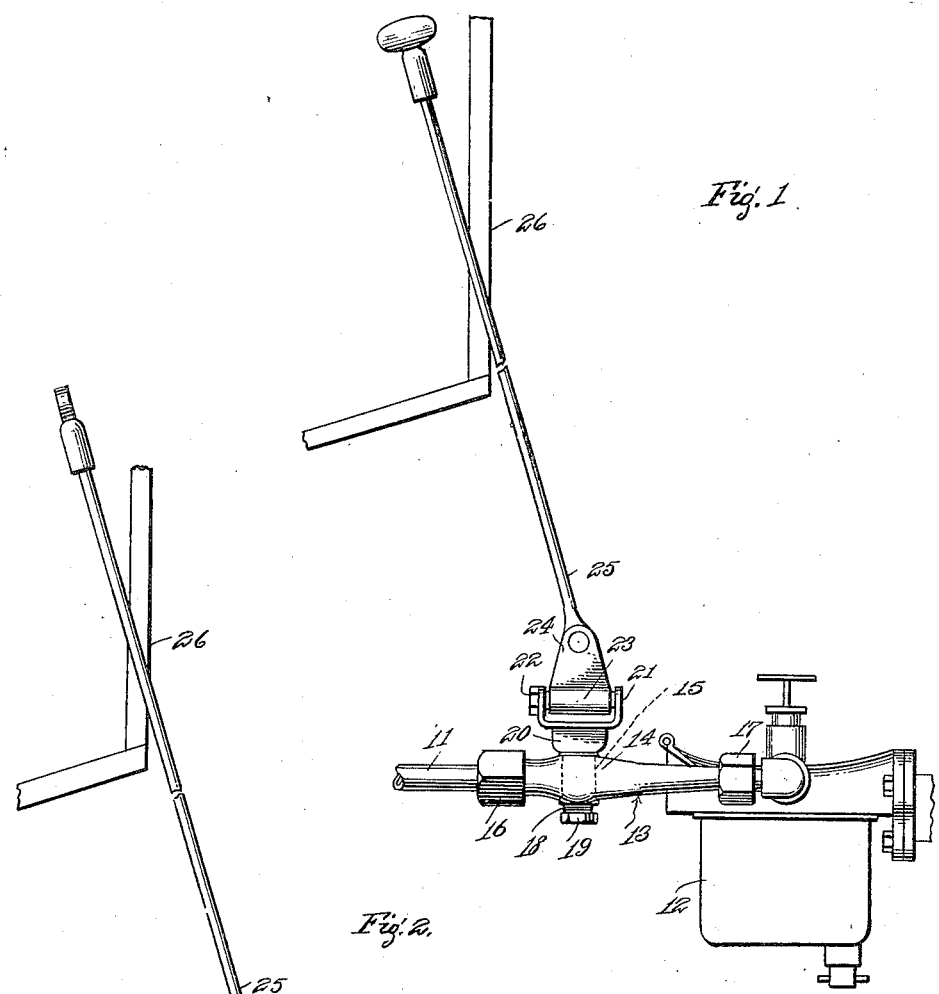
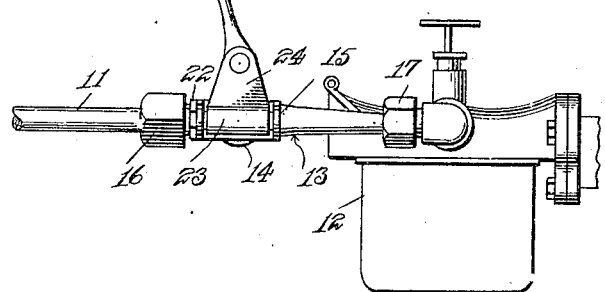
Inventor  
Frederic A. Glover.  
By  
Attorney Patented Apr. 29, 1924.

1,492,447

UNITED STATES PATENT OFFICE.

FREDERIC A. GLOVER, OF WANA, WEST VIRGINIA.

AUTOMOBILE GASOLINE CONTROL.

Application filed April 12, 1923. Serial No. 631,609.

*To all whom it may concern:*

Be it known that I, FREDERIC A. GLOVER, a citizen of the United States, residing at Wana, in the county of Monongalia, State of West Virginia, have invented certain new and useful Improvements in Automobile Gasoline Controls; and I do hereby declare the following to be a full, clear, and exact description of the invention, such as will enable others skilled in the art to which it appertains to make and use the same.

This invention relates to new and useful improvements in automobile devices, and particularly to devices for controlling the flow of gasoline from the tank to the carburetor.

The principal object of the invention is to provide a controlling valve, located in the gasoline, close to the carburetor, whereby the driver may close the flow of gasoline to the carburetor, when leaving his car, thus obviating any danger of loss of gasoline, through a leaking carburetor.

Another object is to provide a device of this character which can be readily and easily operated from the instrument board or dashboard of the automobile, thus obviating the necessity of raising the hood, or reaching beneath the car.

Other objects and advantages will be apparent from the following description when taken in connection with the accompanying drawing.

In the drawing;

Figure 1 is an elevation of the invention, in connection with the carburetor, and a portion of the automobile instrument board.

Figure 2 is a fragmentary side elevation of the means for operating the valve, showing the stem of the valve extending horizontally outwardly away from the side of the valve.

Referring particularly to the accompanying drawing, 11 represents a portion of a gasoline pipe leading from the tank to the carburetor 12.

Disposed in the pipe line 11 is the valve 13, which consists of the body 14 having the turn plug valve 15 therein. One end of the valve body is provided with a coupling 16 for connecting the adjacent end of the pipe 11 therein, while the other end of the body is formed with a neck or stem 13, secured in the carburetor by means of the coupling 17, and the packing (not shown). The plug 15 has a wear compensating spring 18 and nut 19, on one end, externally of the body 14, and on the other end of the plug there is formed a stem 20 having a yoke 21 carried thereby, the arms of which are perforated to receive the bolt 22. Rotatably engaged on this bolt, between the arms of the yoke, is a sleeve 23, and extending from the sleeve is a bifurcated lug 24 in which is pivotally connected one end of an operating rod 25, which rod extends rearwardly through the instrument board 26, of the automobile, within convenient reach of the driver. It will be noted that the pivot of the rod 25 is disposed at right angles to the bolt 22 so that the yoke 21 and the sleeve and rod form a universal joint, thus enabling the rotation of the valve plug from any position of the rod, upon rotary movement of the rod.

When applying the valve to some forms of automobiles, conditions will not permit the yoke 21 to stand vertically, but render it necessary to place the valve with the yoke extending horizontally toward the outside of the automobile. In this case the lug 24 extends vertically from the bolt 22, so that the valve plug is rotated by a reciprocatory movement of the rod 25, the operator's end of the rod being disposed through the instrument board, as in the first instance.

A large amount of gasoline sometimes escapes from the carburetor, due to flooding, which is generally caused by a choking of the needle valve of the carburetor. Ordinarily it is necessary to get under the automobile to turn off the stop cock just above the sediment bulb, which is an annoyance. Sometimes it is necessary to raise the hood and close the needle valve, as well as the before mentioned stock cock. With the present invention the driver simply stops his motor, and then closes the valve 13, which, as clearly seen in the drawing is disposed close to the carburetor, thus stopping the flow of gasoline to the carburetor, and thereby saving gasoline.

What is claimed is:

1. The combination with a carburetor and its gasoline conduit, of a valve connected to the conduit and to the carburetor and including a movable valve member, and an operating means connected with the movable valve member and selectively operable reciprocably or rotatably.

2. The combination with a carburetor and its gasoline conduit, of a valve including a body having a tubular stem on one end connected directly with the carburetor and a coupling connected with the conduit, a valve plug in the body having a yoke on its stem, a sleeve rockably supported between the arms of the yoke, and an operating rod movably connected at right angles to the sleeve for selective actuation reciprocably or rotatably.

In testimony whereof, I affix my signature.

FREDERIC A. GLOVER.